US012739169B1

(12) United States Patent
Cai et al.

(10) Patent No.: US 12,739,169 B1
(45) Date of Patent: Sep. 15, 2026

(54) METHODS FOR FACILITATING DYNAMIC SERVICE-ORIENTED AND SOFTWARE-DEFINED HARDWARE AND DEVICES THEREOF

(71) Applicant: F5 Networks, Inc., Seattle, WA (US)

(72) Inventors: Hao Cai, Sammamish, WA (US); Timothy S. Michels, Greenacres, WA (US); William R. Baumann, Seattle, WA (US); C Stuart Johnson, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 15/980,489

(22) Filed: May 15, 2018

Related U.S. Application Data

(60) Provisional application No. 62/516,721, filed on Jun. 8, 2017.

(51) Int. Cl.
*H04L 41/0816* (2022.01)
*H04L 9/40* (2022.01)
(Continued)

(52) U.S. Cl.
CPC .......... *H04L 41/0816* (2013.01); *H04L 43/16* (2013.01); *H04L 61/4511* (2022.05);
(Continued)

(58) Field of Classification Search
CPC . H04L 41/0816; H04L 43/16; H04L 61/1511; H04L 63/1416; H04L 63/1458; H04L 43/062
(Continued)

(56) References Cited

U.S. PATENT DOCUMENTS 5,719,962 A 2/1998 Sugahara et al.
5,966,057 A 10/1999 Kintis et al.
(Continued)

FOREIGN PATENT DOCUMENTS

FR 2913838 A1 9/2008

OTHER PUBLICATIONS

Euripedes et al., Real-Time Reconfiguration Approach Based on Efficient Classification and Diagnosis of Embedded Systems, Aerospace Technology Congress (Year: 2016).*
(Continued)

*Primary Examiner* — Joseph L Greene
(74) *Attorney, Agent, or Firm* — Troutman Pepper Locke LLP

(57) ABSTRACT

Methods, non-transitory computer readable media, network traffic management apparatuses, and network traffic management systems that configure one or more configurable hardware logic devices based on a current configuration comprising a set of features. Network traffic exchanged with or between one or more clients or one or more servers is monitored. A determination is made when a trigger condition has occurred based on the monitoring. One or more of the configurable hardware logic devices are reconfigured the detected trigger condition to enable hardware acceleration for a feature not included in the set of features, when the determining indicates that the trigger condition is detected. With this technology, hardware acceleration can be provided dynamically for different features, based on observed network conditions, in order to improve the performance of a network traffic management device.

20 Claims, 5 Drawing Sheets

(51) Int. Cl.

| | |
|---|---|
| ***H04L 43/16*** | (2022.01) |
| ***H04L 61/4511*** | (2022.01) |
| *H04L 43/062* | (2022.01) |

(52) U.S. Cl.
CPC ...... *H04L 63/1416* (2013.01); *H04L 63/1458* (2013.01); *H04L 43/062* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 7,403,981 | B2 * | 7/2008 | Master | H04W 88/06 709/220 |
| 7,777,628 | B2 | 8/2010 | Tilson, Jr. | |
| 8,068,731 | B2 | 11/2011 | Peng et al. | |
| 9,521,162 | B1 * | 12/2016 | Zand | H04L 63/1458 |
| 10,225,288 | B2 * | 3/2019 | Haugsnes | G06F 16/23 |
| 2003/0226067 | A1 | 12/2003 | Anonson | |
| 2009/0052426 | A1 | 2/2009 | Perraud | |
| 2009/0086802 | A1 | 4/2009 | Nabetani | |
| 2010/0094981 | A1 * | 4/2010 | Cordray | H04L 41/082 709/222 |
| 2010/0103817 | A1 | 4/2010 | Takayanagi et al. | |
| 2010/0254707 | A1 | 10/2010 | Peng et al. | |
| 2011/0044258 | A1 | 2/2011 | Nezou | |
| 2011/0214157 | A1 * | 9/2011 | Korsunsky | G06F 21/55 726/1 |
| 2012/0240185 | A1 * | 9/2012 | Kapoor | H04L 41/0866 726/1 |
| 2016/0241435 | A1 * | 8/2016 | Iordache | H04L 41/0823 |
| 2016/0308718 | A1 * | 10/2016 | Lanka | G06F 15/7871 |
| 2016/0308719 | A1 * | 10/2016 | Putnam | G06F 9/5027 |
| 2016/0380819 | A1 * | 12/2016 | Burger | H04L 41/0816 709/221 |
| 2017/0019417 | A1 * | 1/2017 | McGrew | H04L 43/20 |
| 2017/0093888 | A1 * | 3/2017 | Marzorati | G06F 21/566 |
| 2017/0214713 | A1 * | 7/2017 | Doron | H04L 63/1458 |
| 2017/0244672 | A1 * | 8/2017 | Shulman | H04L 63/1416 |
| 2017/0250954 | A1 * | 8/2017 | Jain | H04L 63/1416 |
| 2017/0359372 | A1 * | 12/2017 | Ronen | H04L 63/1416 |
| 2018/0034833 | A1 * | 2/2018 | Ahuja | H04L 45/30 |
| 2018/0097693 | A1 * | 4/2018 | Liff | H01H 57/00 |
| 2018/0124090 | A1 * | 5/2018 | Koren | H04L 63/1416 |
| 2018/0191617 | A1 * | 7/2018 | Caulfield | H04L 47/12 |

OTHER PUBLICATIONS

F5 Networks Inc., “VIPRION® Systems: Configuration”, Manual, Sep. 28, 2012, 36 pages, Version 11.2.1, F5 Networks, Inc., Retrieved from the Internet:<https://support.f5.com/kb/en-us/products/big-ip_ltm/manuals/product/viprion-configuration-11-2-1.html>.

F5 Networks Inc., “vCMP® for VIPRION® Systems: Administration”, Manual, Jul. 6, 2015, 94 pages, Version 11.6, F5 Networks, Inc., Retrieved from the Internet:<https://support.f5.com/kb/en-US/products/big-ip_ltm/manuals/product/vcmp-administration-viprion-11-6-0.html>.

F5 Networks Inc., “BIG-IP® Global Traffic Manager™: Concepts”, Manual, Jan. 27, 2014, 62 pages, Version 11.5, F5 Networks, Inc., Retrieved from the Internet:<https://support.f5.com/kb/en-us/products/big-ip_gtm/manuals/product/gtm-concepts-11-5-0.html>.

F5 Networks Inc., “F5 BIG-IP TMOS: Operations Guide”, Manual, Apr. 2018, 229 pages, F5 Networks, Inc., Retrieved from the Internet:<https://support.f5.com/kb/en-us/products/big-ip_ltm/manuals/product/f5-tmos-operations-guide.html>.

F5 Networks Inc., “Software-Defined Hardware: Enabling Performance and Agility with the BIG-IP iSeries Architecture”, Nov. 11, 2016, 8 pages, F5 Networks, Inc., Retrieved from the Internet:<https://f5.com/Portals/1/Cache/Pdfs/2421/software-defined-hardware-enabling-performance-and--agility-with-the-big-ip-iseries-architecture.pdf>.

* cited by examiner

METHODS FOR FACILITATING DYNAMIC SERVICE-ORIENTED AND SOFTWARE-DEFINED HARDWARE AND DEVICES THEREOF

This application claims the benefit of U.S. Provisional Patent Application Ser. No. 62/516,721 filed Jun. 8, 2017, which is hereby incorporated by reference in its entirety.

FIELD

This technology generally relates to configurable hardware logic devices and, more particularly, to facilitating dynamic service-oriented and software-defined configurable hardware logic devices.

BACKGROUND

Many networks include intermediary or proxy devices, such as network traffic management devices, that are disposed between client devices and server devices (e.g., application servers) in order to manage the network traffic exchanged between those devices. Network traffic management devices can provide a number of different services in a network including application acceleration, application security, and load balancing, and can facilitate features, such as low latency or Domain Name System (DNS) cache acceleration, among many others.

Currently, these services and features are provided based on a mixture of hardware and software modules. Configurable hardware logic devices (e.g., Field Programmable Gate Arrays (FPGAs)) can provide hardware acceleration for a subset of services, but it is currently cost-prohibitive to implement all features in hardware. Accordingly, manufacturers of network traffic management devices generally select a set of features that are implemented in hardware out of the box, which can include those features most likely to be utilized in a typical network.

However, deployments of network traffic management devices can vary depending on the type of network and associated network traffic and the network conditions that may be observed within the network (e.g., Denial of Service (DoS) attacks). Accordingly, network traffic management devices are currently accelerating certain services in hardware that are not significantly utilized or desirable, while not accelerating other functionality in hardware that would otherwise significantly improve performance.

SUMMARY

A method for facilitating service-oriented and software-defined hardware implemented by a network traffic management system comprising one or more network traffic management apparatuses, server devices, or client devices, the method including configuring one or more configurable hardware logic devices based on a current configuration comprising a set of features. Network traffic exchanged with or between one or more clients or one or more servers is monitored. A determination is made when a trigger condition has occurred based on the monitoring. One or more of the configurable hardware logic devices are reconfigured the detected trigger condition to enable hardware acceleration for a feature not included in the set of features, when the determining indicates that the trigger condition is detected. With this technology, hardware acceleration can be provided dynamically for different features, based on observed network conditions, in order to improve the performance of a network traffic management device.

A network traffic management apparatus, comprising memory comprising programmed instructions stored thereon and one or more processors configured to be capable of executing the stored programmed instructions to configure one or more configurable hardware logic devices based on a current configuration comprising a set of features. Network traffic exchanged with or between one or more clients or one or more servers is monitored. A determination is made when a trigger condition has occurred based on the monitoring. One or more of the configurable hardware logic devices are reconfigured the detected trigger condition to enable hardware acceleration for a feature not included in the set of features, when the determining indicates that the trigger condition is detected. With this technology, hardware acceleration can be provided dynamically for different features, based on observed network conditions, in order to improve the performance of a network traffic management device.

A non-transitory computer readable medium having stored thereon instructions for facilitating service-oriented and software-defined hardware comprising executable code that, when executed by one or more processors, causes the processors to configure one or more configurable hardware logic devices based on a current configuration comprising a set of features. Network traffic exchanged with or between one or more clients or one or more servers is monitored. A determination is made when a trigger condition has occurred based on the monitoring. One or more of the configurable hardware logic devices are reconfigured the detected trigger condition to enable hardware acceleration for a feature not included in the set of features, when the determining indicates that the trigger condition is detected. With this technology, hardware acceleration can be provided dynamically for different features, based on observed network conditions, in order to improve the performance of a network traffic management device.

A network traffic management system comprising one or more network traffic management apparatuses, server devices, or client devices, the network traffic management system comprising memory comprising programmed instructions stored thereon and one or more processors configured to be capable of executing the stored programmed instructions to configure one or more configurable hardware logic devices based on a current configuration comprising a set of features. Network traffic exchanged with or between one or more clients or one or more servers is monitored. A determination is made when a trigger condition has occurred based on the monitoring. One or more of the configurable hardware logic devices are reconfigured the detected trigger condition to enable hardware acceleration for a feature not included in the set of features, when the determining indicates that the trigger condition is detected. With this technology, hardware acceleration can be provided dynamically for different features, based on observed network conditions, in order to improve the performance of a network traffic management device.

This technology has a number of associated advantages including providing methods, non-transitory computer readable media, network traffic management apparatuses, and network traffic management systems that facilitate service-oriented and software-defined hardware to dynamically reconfigure configurable hardware logic device(s) based on characteristics of observed network traffic in a particular deployed network. By dynamically reconfiguring the configurable hardware logic device(s), an optimized set of relevant features can be accelerated in hardware, thereby improving the performance of network traffic management apparatuses.

DETAILED DESCRIPTION

Figure 1:
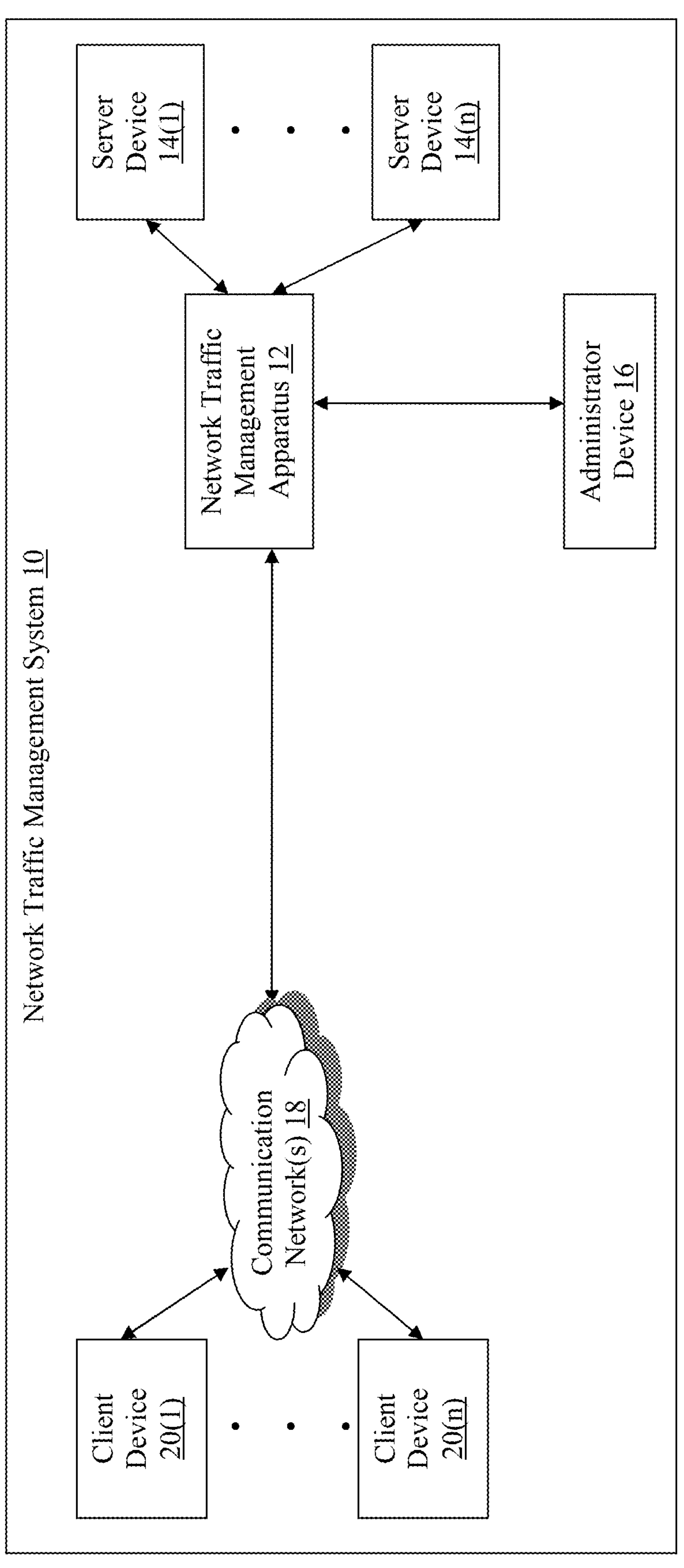
FIG. 1 is a block diagram of an exemplary network traffic management system with a network traffic management apparatus.

Referring to FIG. 1, an exemplary network environment which incorporates an exemplary network traffic management system 10 is illustrated. The network traffic management system 10 in this example includes a network traffic management apparatus 12 that is coupled to server devices 14(1)-14(*n*), and administrator device 16, and, via communication network(s) 18, a plurality of client devices 20(1)-20(*n*), although the network traffic management apparatus 12, server devices 14(1)-14(*n*), administrator device 16, and/or client devices 20(1)-20(*n*) may be coupled together via other topologies. The network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that facilitate improved performance by reconfiguring configurable hardware logic devices to dynamically provide hardware acceleration for particular features.

Figure 2:
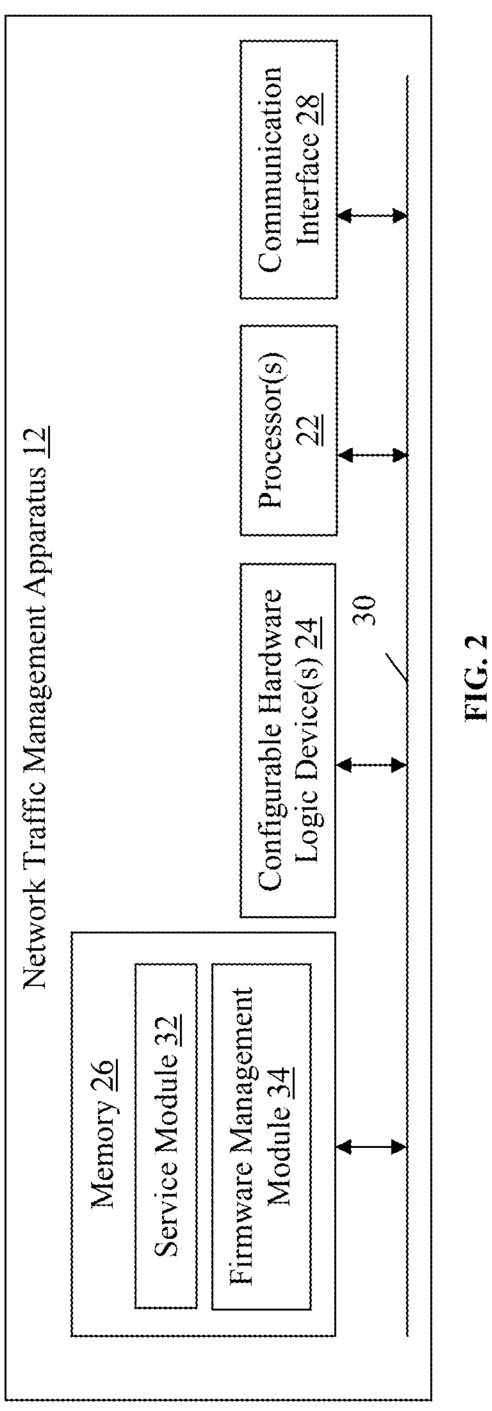
FIG. 2 is a block diagram of a network traffic management apparatus.

Referring to FIGS. 1-2, the network traffic management apparatus 12 may perform any number of functions including managing network traffic, load balancing network traffic across the server devices 14(1)-14(*n*), accelerating network traffic associated with web applications hosted by the server devices 14(1)-14(*n*), and/or providing Authentication, Authorization, and Accounting (AAA) or Domain Name System (DNS) services, for example. The network traffic management apparatus 12 includes processor(s) 22, configurable hardware logic device(s) 24, a memory 26, and/or a communication interface 28, which are coupled together by a bus 30 or other communication link, although the network traffic management apparatus 12 can include other types and/or numbers of elements in other configurations.

The processor(s) 22 of the network traffic management apparatus 12 may execute programmed instructions stored in the memory 26 of the network traffic management apparatus 12 for the any number of the functions identified above and/or described and illustrated herein. The processor(s) 22 of the network traffic management apparatus 12 may include one or more CPUs or general purpose processors with one or more processing cores, for example, although other types of processor(s) can also be used.

The configurable hardware logic device(s) 24 may include specialized hardware configured to implement one or more steps of this technology as illustrated and described with reference to the examples herein. By way of example only, the configurable hardware logic device(s) 24 may include one or more of field programmable gate arrays (FPGAs), field programmable logic devices (FPLDs), application specific integrated circuits (ASICs), and/or programmable logic units (PLUs), although other types of configurable hardware logic can also be used. The configurable hardware logic device(s) 24 provide hardware acceleration for particular features not performed by software stored in the memory 26, and can be configured based on personas, each of which corresponds to a set of features.

The memory 26 of the network traffic management apparatus 12 stores programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 26.

Accordingly, the memory 26 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 26 of the network traffic management apparatus 12 includes a service module 32 and a firmware management module 34, although the memory 26 can include other policies, modules, databases, or applications, for example. The service module 32 is configured to implement one or more services or features in software on behalf of the network traffic management apparatus 12. Accordingly, the service module 32 can be an application delivery controller (ADC) module, a domain name system (DNS) module, an application acceleration and/or security module, a denial of service (DoS) protection module, a low latency module, or any other type of module that is configured to provide a service in the network traffic management system 10. While only one service module is illustrated in FIG. 2, the network traffic management apparatus 12 can include any number of service modules in other examples.

The firmware management module 34 is configured to monitor and observe network traffic to determine whether the appropriate features are being accelerated in hardware by the configurable hardware logic device(s) 24 in order to optimize performance of the network traffic management apparatus 12. Accordingly, the firmware management module 34 in some examples categorizes the network traffic to determine whether the network traffic corresponds with a service signature or network condition having an associated feature that is not currently being accelerated by the configurable hardware logic device(s) 24, as described and illustrated in more detail later.

The firmware management module 34 also dynamically reconfigures the configurable hardware logic device(s) 24 following identification of a trigger condition and, more generally, determines the mixture of features that are implemented in software and hardware. The firmware management module 34 is further configured in some examples to provide a Graphical User Interface (GUI) to the administrator device 16 to facilitate manual selection of certain features or personas to be implemented in hardware, and configures the configurable hardware logic device(s) 22 accordingly.

The communication interface 28 of the network traffic management apparatus 12 operatively couples and communicates between the network traffic management apparatus 12, server devices **14(1)-14(*n*), administrator device 16, and/or client devices 20(1)-20(*n*), which are all coupled together by the communication network(s) 18** or direct connections, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the network traffic management apparatus 12 or one or more of the server devices **14(1)-14(*n*)** operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus.

Additionally, one or more of the devices that together comprise the network traffic management apparatus 12 in other examples can be standalone devices or integrated with one or more other devices or apparatuses, such as one of the server devices **14(1)-14(*n*), for example. Moreover, one or more of the devices of the network traffic management apparatus 12** in these examples can be in a same or a different communication network including one or more public, private, or cloud networks, for example.

Each of the server devices **14(1)-14(*n*) in this example includes one or more processors, a memory, and a communication interface, which are coupled together by a bus or other communication link, although other numbers and/or types of network devices could be used. The server devices 14(1)-14(*n*) in this example process requests received from the client devices 20(1)-20(*n*)** via the communication network(s) according to the HTTP-based application RFC protocol, for example.

The requests received from the client devices **20(1)-20(*n*) can be directed to content or applications hosted by the server devices 14(1)-14(*n*), for example. Various applications may be operating on the server devices 14(1)-14(*n*) and transmitting data (e.g., files or Web pages) to the client devices 20(1)-20(*n*) in response to requests from the client devices 20(1)-20(*n*). The server devices 14(1)-14(*n*)** may be hardware or software or may represent a system with multiple servers in a pool, which may include internal or external networks.

Although the server devices **14(1)-14(*n*) are illustrated as single devices, one or more actions of the server devices 14(1)-14(*n*) may be distributed across one or more distinct network computing devices that together comprise one or more the server devices 14(1)-14(*n*). Moreover, the server devices 14(1)-14(*n*) are not limited to a particular configuration. Thus, the server devices 14(1)-14(*n*) may contain a plurality of network computing devices that operate using a master/slave approach, whereby one of the network computing devices of one or more of the server devices 14(1)-14(*n*) operate to manage and/or otherwise coordinate operations of the other network computing devices. The server devices 14(1)-14(*n*)** may operate as a plurality of network computing devices within a cluster architecture, a peer-to peer architecture, virtual machines, or within a cloud architecture, for example.

The client devices **20(1)-20(*n*) in this example include any type of computing device that can request and receive web content, such as mobile computing devices, desktop computing devices, laptop computing devices, tablet computing devices, virtual machines (including cloud-based computers), or the like. Each of the client devices 20(1)-20(*n*)** in this example includes a processor, a memory, and a communication interface, which are coupled together by a bus or other communication link, although other numbers and/or types of network devices could be used.

The client devices **20(1)-20(*n*) may run interface applications, such as standard web browsers or standalone client applications, which may provide an interface to make requests for, and receive content stored on, the server device 14(1)-14(*n*) via the communication network(s) 18. The client devices 20(1)-20(*n*)** may further include a display device, such as a display screen or touchscreen, and/or an input device, such as a keyboard for example.

The administrator device 16 in this example includes a processor, a memory, a communication interface, an input device, and a display device, which are coupled together by a bus or other communication link. A user of the administrator device 16 may communicate with the network traffic management apparatus 12 over a local area network, for example, and via a provided GUI to select particular features to be hardware-accelerated by the configurable hardware logic device(s) 24 as part of an initial configuration or a in response to a notification that a trigger condition has occurred, for example, as described and illustrated in more detail later.

Although the exemplary network traffic management system 10 with the network traffic management apparatus 12, server devices 14(1)-14(*n*), administrator device 16, and client devices 20(1)-20(*n*) is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, server devices 14(1)-14(*n*), administrator device 16, or client devices 20(1)-20(*n*), for example, may be configured to operate as virtual instances on the same physical machine. In other words, one or more of the network traffic management apparatus 12, server devices 14(1)-14(*n*), administrator device 16, or client devices 20(1)-20(*n*) may operate on the same physical device rather than as separate devices communicating through communication network(s) or other types of connections. Additionally, there may be more or fewer network traffic management apparatuses, server devices, administrator devices, or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by the processor(s) 22, cause the processor(s) 22 to carry out steps necessary to implement the methods of the examples of this technology that are described and illustrated herein.

Figure 3:
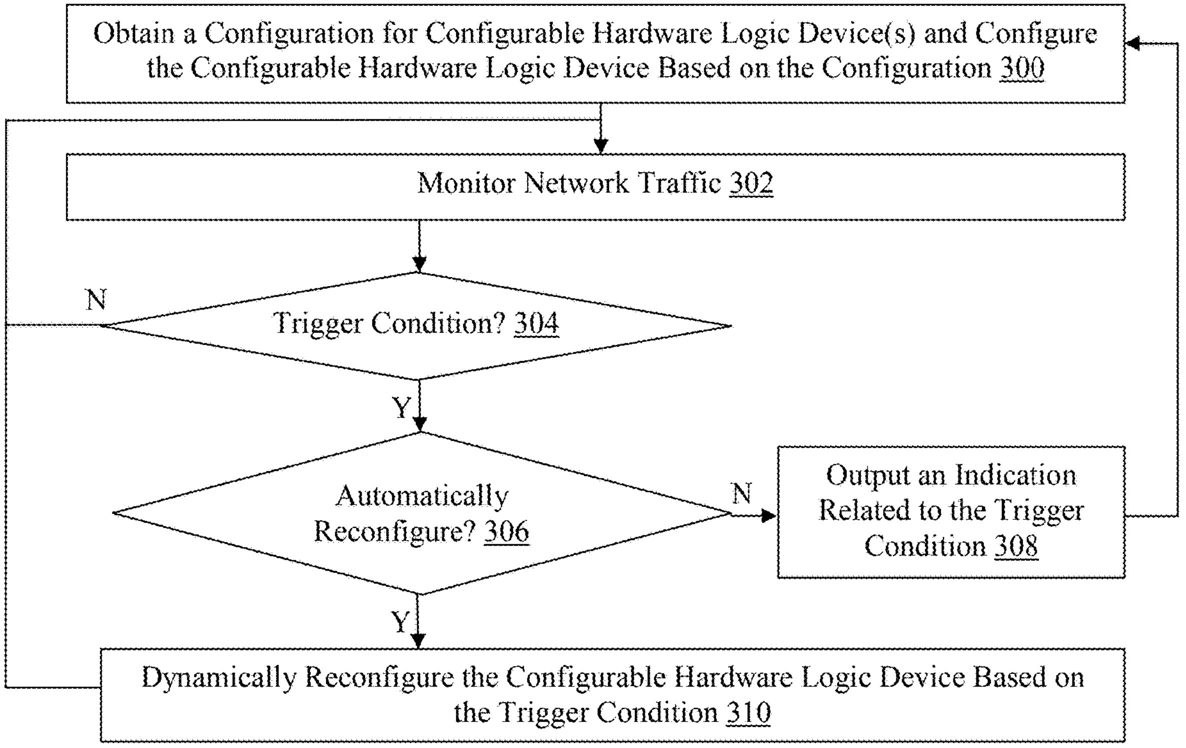
FIG. 3 is a flowchart of an exemplary method for facilitating service-oriented and software-defined hardware.

Referring more specifically to FIG. 3, a flowchart of an exemplary method for facilitating service-oriented and software-defined hardware is illustrated. In step 300 in this example, the network traffic management apparatus 12 obtains a configuration for the configurable hardware logic device(s) 24 and configures the configurable hardware logic device(s) 24 based on the configuration. The configuration can be obtained from the manufacturer, and can be a default configuration. Alternatively, the initial configuration can be based on input received from the administrator device 16. In this example, the network traffic management apparatus 12 can provide a GUI with selectable indications for various personas or features to be included in the configuration.

Figure 4:
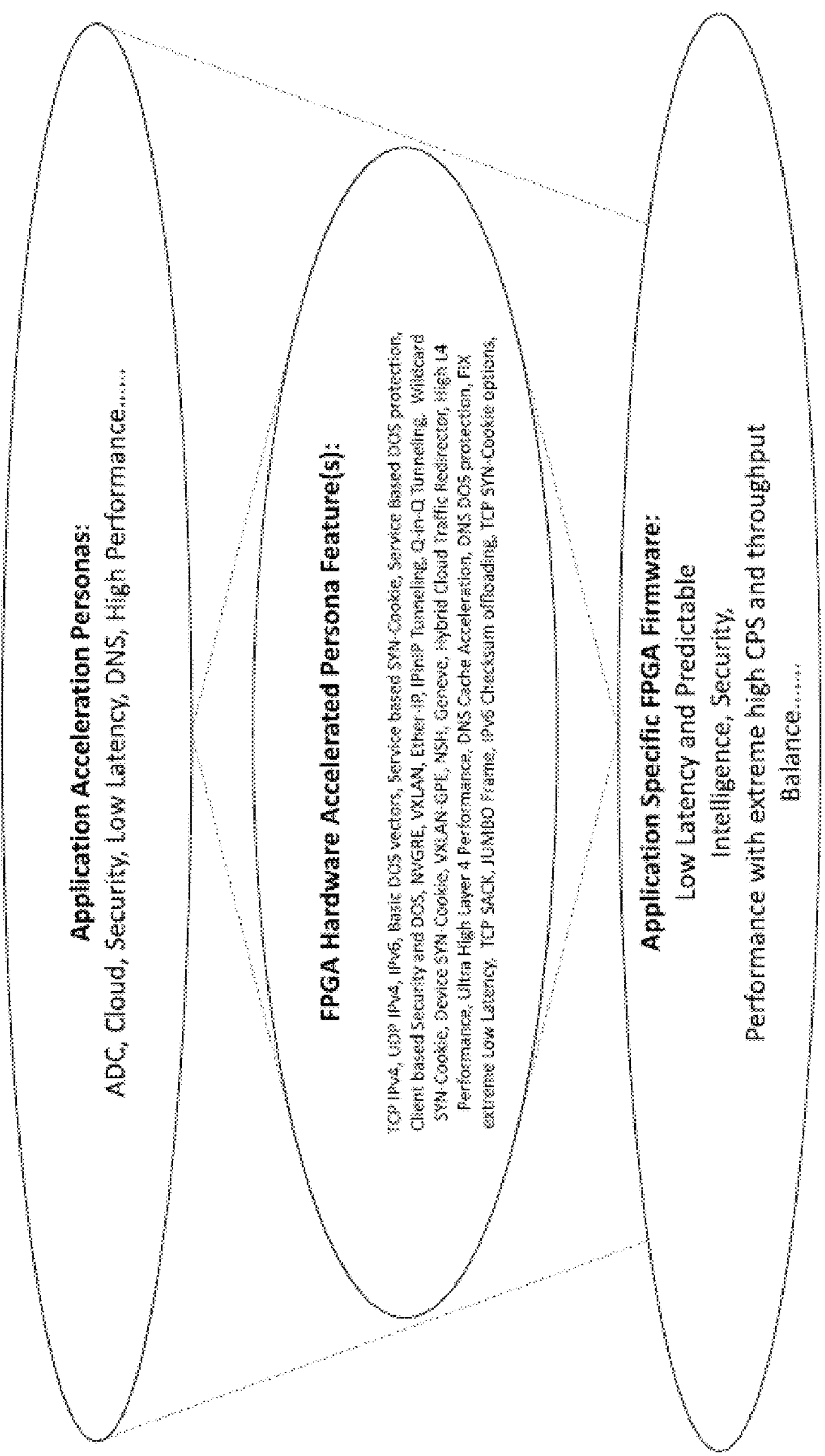
FIG. 4 is a hierarchical diagram of exemplary configurable hardware logic device features.

Referring more specifically to FIG. 4, a hierarchical diagram of features is illustrated. In this example, the configurable hardware logic device(s) 24 can be configured based on an application-specific configuration, an application acceleration persona, or individual features. Exemplary application specific configurations include low latency and predictable intelligence and security and exemplary application acceleration personas can include ADC and DNS, although any number and type of application acceleration personas or application-specific configurations can also be used.

Accordingly, the application specific configurations and/or application acceleration personas each include a subset of hardware accelerated persona features in this example. In one particular example, the security application acceleration persona may include basic DoS vectors, service-based DoS protection, and DNS DoS protection features and the DNS persona may include DNS cache acceleration and DNS DoS protection features. Similarly, the low latency and predictable intelligence application specific configuration can include ultra high layer 4 performance and DNS cache acceleration, although any other method of organizing features can also be used.

Each of the features corresponds with one or more services that can be provided by either the software-based service 32 module or the configurable hardware logic device(s) 24. Accordingly, the features are services that are candidates for hardware acceleration. Due to size and cost constraints of the configurable hardware logic device(s) 24, all of the services cannot be hardware-accelerated at any particular time. With this technology, a set of applicable features can be hardware-accelerated, and implemented by the configurable hardware-logic device(s) 24, based on dynamic software-defined hardware and current network context and conditions in order to optimize the performance of the network traffic management apparatus 12.

Referring back to FIG. 3, in step 302, the network traffic management apparatus 12 monitors network traffic exchanged with or between the client devices 20(1)-20(*n*) and/or the server devices 14(1)-14(*n*), and analyzes or categorizes the network traffic. In one example, the network traffic management apparatus 12 categorizes the network traffic based on characteristics, such as header information, in order to determine a type of the network traffic (e.g., DNS traffic), although other types of characteristics and other methods of categorizing the network traffic can also be used. In another example, the network traffic can be monitored to determine whether a DoS attack is occurring and, if so, information regarding the potential source(s) of the DoS attack.

In step 304, the network traffic management apparatus 12 determines whether a trigger condition has occurred. A trigger condition occurs when the network traffic management apparatus 12 determines, based on the monitoring in step 302, that a feature that is not currently hardware-accelerated (e.g., a feature implemented in software by the service module 32) may improve performance of the network traffic management apparatus 12 if implemented by the configurable hardware logic device(s) 24.

In one particular example, the network traffic management apparatus 12 monitors the network traffic in step 302 and identifies a percentage of the traffic associated with TCP port 53, which is categorized as DNS traffic. In step 304, the network traffic management apparatus 12 determines that the percentage of the traffic that is DNS traffic exceeds a threshold and, therefore, the DNS persona would improve performance with associated DNS DoS protection and DNS cache acceleration features implemented by the configurable hardware logic device(s) 24. Since, in this example, those features are not implemented in hardware based on the current configuration, the network traffic management apparatus 12 determines that a trigger condition has occurred.

In another example, the network traffic management apparatus 12 can monitor the network traffic in step 302 and determine that a DoS attack is occurring based on a current attack vector (e.g., combination of packet attributes such as source/destination IP address and source/destination port number, etc.). In step 304, the network traffic management apparatus 12 in this particular example determines that the current attack vector is not included in the basic DoS vector feature that is part of the current configuration of the configurable hardware logic device(s) 24. Accordingly, a trigger condition has occurred since more nefarious network traffic could be blocked/mitigated if DoS protection using the current attack vector was hardware-accelerated. Many other types of trigger conditions can be used in other examples.

Accordingly, if the network traffic management apparatus 12 determines in step 304 that a trigger condition has not occurred, then the No branch is taken to step 302 and the network traffic management apparatus 12 continues monitoring network traffic. However, if the network traffic management apparatus 12 determines in step 304 that a trigger condition has occurred, then the Yes branch is taken to step 306.

In step 306, the network traffic management apparatus 12 optionally determines whether automatic reconfiguration has been enabled so allow for dynamic reconfiguration of the configurable hardware logic device(s) 24 in response to identifying a trigger condition. The automatic reconfiguration can be enabled by an administrator using the administrator device 16 via a GUI, such as a GUI provided to facilitate input of an initial configuration including a set of features to be hardware-accelerated, for example.

In other examples, the network traffic management apparatus 12 can be configured out of the box or by default with automatic reconfiguration either enabled or disabled. In yet other examples, automatic reconfiguration can be enabled for certain types of trigger condition (e.g., relating to security) while disabled for other types of trigger condition (e.g., latency/performance). If the network traffic management apparatus 12 determines in step 306 that automatic reconfiguration of the configurable hardware logic device(s) 24 is not enabled, then the No branch is taken to step 308.

In step 308, the network traffic management apparatus 12 outputs an indication related to the trigger condition. In one example, the network traffic management apparatus 12 can output a notification to the administrator device 16 that includes an indication of the feature(s) that resulted in the trigger condition and that are recommended for hardware acceleration (e.g., DNS persona or a DoS protection feature with a particular DoS vector). Other information can also be included with the output indication. Following the output indication, the network traffic management apparatus 12 can proceed back to step 300 in one example and receive a manual adjustment of the features that are hardware-accelerated, and can configure the configurable hardware logic device(s) 24 accordingly.

However, referring back to step 306, if the network traffic management apparatus 12 determines that the automatic reconfiguration is enabled, then the Yes branch is taken to step 310. In step 310, the network traffic management apparatus 12 automatically and dynamically reconfigures the configurable hardware logic device(s) 24 in real-time based on the trigger condition and associated feature(s). In particular, the network traffic management apparatus 12 can introduce a bit steam to the configurable hardware logic device(s) 24 in order to program or configure the configurable hardware logic device(s) 24 to implement a feature, such as the feature(s) associated with the DNS persona or a DoS protection feature with a particular DoS vector in the examples described and illustrated earlier.

In some iterations in which the configurable hardware logic device(s) 24 are sufficiently under-utilized, reconfiguration may merely require hardware-accelerating certain feature(s). However, in other examples, the network traffic management apparatus 12 also reconfigures the configurable hardware logic device(s) 24 such that feature(s) currently hardware-accelerated are shifted to being performed in software by the service module 32. The network traffic management apparatus 12 can identify the feature(s) to shift to software any number of ways. In one example, the network traffic management apparatus 12 can swap a DoS vector in software with another DoS vector implemented in hardware.

In another example, the network traffic management apparatus 12 can use other statistics or observations resulting from monitoring of the network traffic. For example, the network traffic management apparatus 12 may determine that the DNS persona is the best candidate for removal from the configurable hardware logic device(s) 24 in order to introduce a cloud persona associated with a trigger condition because a relatively low percentage of historical, received network traffic is DNS traffic. Other methods for determining the mixture of features implemented in software and those that are hardware-accelerated and implemented by the configurable hardware logic device(s) 24 can also be used in other examples. Subsequent to the dynamic reconfiguration in this example, the network traffic management apparatus 12 proceeds back to step 302 and continues to monitor network traffic.

Figure 5:
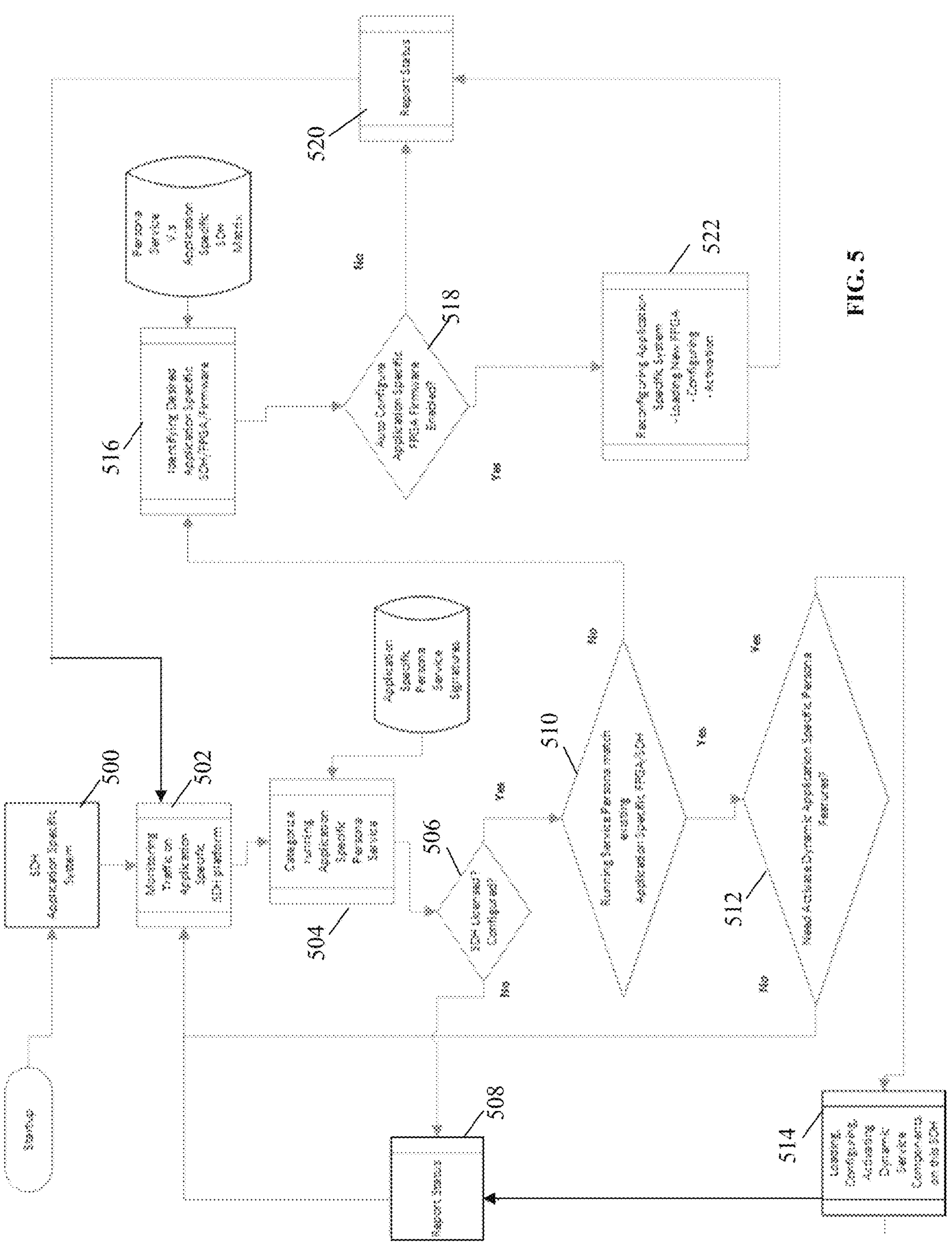
FIG. 5 is a flowchart of another exemplary method for facilitating service-oriented and software-defined hardware.

Referring more specifically to FIG. 5, a flowchart of another exemplary method for facilitating service-oriented and software-defined hardware is illustrated. In step 500 in this example, the network traffic management apparatus 12, referred to in FIG. 5 as a software-defined hardware (SDH) application specific system, becomes operational within a network based on an initial configuration. The initial configuration includes a set of features that are hardware-accelerated by the configurable hardware logic device(s) 24, as well as another set of features implemented in software (e.g., by the service module 32). The initial configuration can be established by an administrator via a provided GUI or can be introduced by a manufacturer of the network traffic management apparatus 12, for example.

In step 502, the network traffic management apparatus 12 monitors network traffic received from the client devices 20(1)-20(*n*) and/or the server devices 14(1)-14(*n*), although traffic exchanged with other types of network devices can also be monitored in other examples. Various characteristics or attributes of the network traffic can be monitored including the type of network traffic, header values, payloads, and statistics regarding the network traffic, for example.

In step 504, the network traffic management apparatus 12 categorizes the network traffic based on service signatures to identify one or more personas or one or more particular features of one or more personas. Accordingly, each persona, for example, can be correlated in a database, table, or matrix, for example, with network traffic characteristic(s) or traffic patterns, referred to in FIG. 5 as service signatures. The service signatures can be compared with characteristic(s) of the monitored network traffic to identify a corresponding one of the personas that may be desirable to implement based on the network context.

In step 506, the network traffic management apparatus 12 optionally determines whether it has a license stored or configured for the persona identified in step 504. In one example, the network traffic management apparatus 12 in step 504 identifies TCP port 53 traffic and compares that characteristic of the network traffic with a stored service signature or traffic pattern including TCP port 53 traffic, which is correlated with a DNS persona. Accordingly, the network traffic management apparatus 12 can determine in step 506 whether it has a license for the identified DNS persona. The license can be obtained from a provider of the bit stream for the features associated with the personas, such as a manufacturer of the network traffic management apparatus 12, optionally for a fee. If the network traffic management apparatus 12 determines that it does not have a license for the identified persona, then the No branch is taken to step 508.

In step 508, the network traffic management apparatus 12 reports the status, such as to the administrator device 16, to indicate that the DNS persona may facilitate improved performance, but is not currently licensed. In response, a user of the administrator device 16 can optionally request and interact with a GUI provided by the network traffic management apparatus 12 to obtain the license and initiate a manual reconfiguration of the configurable hardware logic device(s) 24. However, if the network traffic management apparatus 12 determines in optional step 506 that the persona identified in step 504 is licensed, then the Yes branch is taken to step 510.

In step 510, the network traffic management apparatus 12 determines whether the persona identified in step 504 is currently hardware-accelerated such that one or more of the features associated with the persona are currently implemented by the configurable hardware logic device(s) 24. Accordingly, the trigger condition in this example is based on a comparison of a recommended persona and one or more personas included in a current configuration of the configurable hardware logic device(s) 24. If the network traffic management apparatus 12 determines that the persona is currently hardware-accelerated, then the Yes branch is taken to step 512.

In step 512, the network traffic management apparatus 12 determines whether any particular features within a persona should be activated or accelerated in hardware by the configurable hardware logic device(s) 24. In one example, the current configuration of the configurable hardware logic device(s) 24 can include a DoS protection persona, but an attack vector for an identified DoS attack is not currently one of the vectors that is hardware-accelerated. Accordingly, if the network traffic management apparatus 12 determines that there is a feature (e.g., an attack vector) that should hardware-accelerated, then the Yes branch is taken to step 514.

In step 514, the network traffic management apparatus 12 reconfigures the configurable hardware logic device(s) 24 to enable hardware acceleration of the feature identified in step 512. In some examples, automatic, dynamic reconfiguration for a feature or subset of a persona is enabled by default, and will not require significant disruption, although whether the configurable hardware logic device(s) 24 can be automatically reconfigured can also be configurable by an administrator in other examples. Also optionally, the network traffic management apparatus 12 can reconfigure the configurable hardware logic device(s) so as to disable acceleration in hardware of one or more other features.

In step 508, the network traffic management apparatus 12 reports the status to the administrator device 16, including information regarding the reconfiguration of the configurable hardware logic device(s) 24. The information can include an indication of any feature(s) for which hardware acceleration has been enabled or disabled, for example. Subsequent to reporting the status in step 508, or if the network traffic management apparatus 12 determines in step 512 that there is not a feature that should be hardware-accelerated, then the network traffic management apparatus 12 proceeds to step 502 and continues monitoring network traffic.

Referring back to step 510, if the network traffic management apparatus 12 determines that the persona identified in step 504 is not currently hardware-accelerated, then the No branch is taken to step 516. In step 516, the network traffic management apparatus 12 determines the features associated with the persona identified in step 504, which can optionally be stored in a matrix, table, database, or other data storage structure.

In step 518, the network traffic management apparatus 12 determines whether automatic reconfiguration of the configurable hardware logic device(s) 24 is enabled. Since reconfiguring the configurable hardware logic device(s) 24 to have a new or different persona may be a relatively extensive change as compared to hardware-accelerating a particular feature, requiring a service disruption, automatic reconfiguration of personas may be disabled by default or by administrator input in some examples. Accordingly, if the network traffic management apparatus 12 determines that automatic reconfiguration of the configurable hardware logic device(s) 24 is not enabled, then the No branch is taken to step 520.

In step 520, the network traffic management apparatus 12 reports the status, such as by sending a notification message to the administrator device 16 identifying the recommended persona, although other types of reporting can also be used. Subsequent to reporting the status, the network traffic management apparatus 12 can proceed back to step 502 and continue to monitor received network traffic. However, if the network traffic management apparatus 12 determines in step 518 that automatic reconfiguration of the configurable hardware logic device(s) 24 is enabled, then the Yes branch is taken to step 522.

In step 522, the network traffic management apparatus 12 reconfigures the configurable hardware logic device(s) 24 based on the persona identified in step 504. In some examples, the reconfiguration may require deactivating and reloading the configurable hardware logic device(s) 24 and reconfiguring one or more interfaces of the configurable hardware logic device(s) 24, as well as an associated service disruption.

Additionally, the network traffic management apparatus 12 can determine, based on any number of inputs including utilization and characteristics of observed network traffic, which persona(s) and/or feature(s) should no longer be hardware-accelerated to accommodate accelerating the persona identified in step 504 in hardware. Subsequent to reconfiguring the configurable hardware logic device(s) 24, the network traffic management apparatus 12 can report the status, including information regarding the automatic reconfiguration, to the administrator device 16.

Accordingly, with this technology, features are identified that correlate with observed characteristics of network traffic in a particular network. A limited hardware resource of configurable hardware logic device(s) is then dynamically configured in order to accelerate the identified features and implement other, relatively less useful, relevant, or important features in software. Accordingly, performance of network traffic management apparatuses is significantly improved and utilization of associated hardware resources is advantageously optimized with this technology.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing software-defined hardware implemented by a network traffic management system comprising one or more network traffic management apparatuses, server devices, or client devices, the method comprising:

monitoring network traffic exchanged with or between one or more clients or one or more servers using a first configurable hardware logic device configured to enable hardware acceleration for a first set of predetermined protection features comprising one or more features predicted to combat attacks above a set threshold;

determining, based on the monitored network traffic, that a trigger condition is satisfied when a network attack associated with a DOS attack vector is detected and when a predetermined protection scheme for defending against the detected network attack is absent from the first set of predetermined protection features;

responsive to determining the trigger condition is satisfied, routing the network traffic to a second configurable hardware logic device configured to enable hardware acceleration for a second set of predetermined protection features comprising the predetermined protection scheme for defending against the detected network attack;

determining whether the trigger condition is associated with automatic reconfiguration;

responsive to determining that the trigger condition is associated with automatic reconfiguration:

reconfiguring the first configurable hardware logic device to enable hardware acceleration for the predetermined protection scheme for defending against the detected network attack, when the determination indicates the trigger condition is satisfied, wherein the DOS attack vector comprises one or more attributes of one or more packets comprising at least a portion of the monitored network traffic associated with the network attack, and processing additional network traffic corresponding to the detected network attack with the reconfigured first configurable hardware logic device; and responsive to determining the trigger condition is not associated with automatic reconfiguration:

outputting an indication related to the trigger condition.

2. The method of claim 1, further comprising reconfiguring the one or more of the configurable hardware logic devices to disable hardware acceleration for at least one other feature in the set of features such that the other feature is subsequently provided by software, when the determination indicates the trigger condition is satisfied.

3. The method of claim 1, further comprising configuring the configurable hardware logic devices based on a received selection of one or more of the set of features or one or more personas comprising another one or more of the set of features.

4. The method of claim 1, further comprising:

comparing one or more characteristics of the monitored network traffic with a stored plurality of service signatures to identify one of the service signatures; and reconfiguring the one or more of the configurable hardware logic devices based on the trigger condition to enable hardware acceleration for another feature not included in the set of features, wherein the another feature is correlated with the one of the service signatures.

5. A network traffic management apparatus, comprising memory comprising programmed instructions stored thereon and one or more processors configured to be capable of executing the stored programmed instructions to:

monitor network traffic exchanged with or between one or more clients or one or more servers using a first configurable hardware logic device configured to enable hardware acceleration for a first set of predetermined protection features comprising one or more features predicted to combat attacks above a set threshold;

determine, based on the monitored network traffic, that a trigger condition is satisfied when a network attack associated with a DOS attack vector is detected and when a predetermined protection scheme for defending against the detected network attack is absent from the first set of predetermined protection features;

responsive to determining the trigger condition is satisfied, route the network traffic to a second configurable hardware logic device configured to enable hardware acceleration for a second set of predetermined protection features comprising the predetermined protection scheme for defending against the detected network attack;

determine whether the trigger condition is associated with automatic reconfiguration;

responsive to determining that the trigger condition is associated with automatic reconfiguration:

reconfigure the first configurable hardware logic device to enable hardware acceleration for the predetermined protection scheme for defending against the detected network attack, when the determination indicates the trigger condition is satisfied, wherein the DOS attack vector comprises one or more attributes of one or more packets comprising at least a portion of the monitored network traffic associated with the network attack, and process additional network traffic corresponding to the detected network attack with the reconfigured first configurable hardware logic device; and responsive to determining the trigger condition is not associated with automatic reconfiguration:

output an indication related to the trigger condition.

6. The network traffic management apparatus of claim 5, wherein the processors are further configured to be capable of executing the stored programmed instructions to reconfigure the one or more of the configurable hardware logic devices to disable hardware acceleration for at least one other feature in the set of features such that the other feature is subsequently provided by software, when the determination indicates the trigger condition is satisfied.

7. The network traffic management apparatus of claim 5, wherein the processors are further configured to be capable of executing the stored programmed instructions to configure the configurable hardware logic devices based on a received selection of one or more of the set of features or one or more personas comprising another one or more of the set of features.

8. The network traffic management apparatus of claim 5, wherein the processors are further configured to be capable of executing the stored programmed instructions to:

compare one or more characteristics of the monitored network traffic with a stored plurality of service signatures to identify one of the service signatures; and reconfigure the one or more of the configurable hardware logic devices based on the trigger condition to enable hardware acceleration for another feature not included in the set of features, wherein the another feature is correlated with the one of the service signatures.

9. A non-transitory computer readable medium having stored thereon instructions for managing software-defined hardware comprising executable code that, when executed by one or more processors, causes the processors to:

monitor network traffic exchanged with or between one or more clients or one or more servers using a first configurable hardware logic device configured to enable hardware acceleration for a first set of predetermined protection features comprising one or more features predicted to combat attacks above a set threshold;

determine, based on the monitored network traffic, that a trigger condition is satisfied when a network attack associated with a DOS attack vector is detected and when a predetermined protection scheme for defending against the detected network attack is absent from the first set of predetermined protection features;

responsive to determining the trigger condition is satisfied, route the network traffic to a second configurable hardware logic device configured to enable hardware acceleration for a second set of predetermined protection features comprising the predetermined protection scheme for defending against the detected network attack;

determine whether the trigger condition is associated with automatic reconfiguration;

responsive to determining that the trigger condition is associated with automatic reconfiguration:

reconfigure the first configurable hardware logic device to enable hardware acceleration for protection against the detected network attack, when the determination indicates the trigger condition is satisfied, wherein the DOS attack vector comprises one or more attributes of one or more packets comprising at least a portion of the monitored network traffic associated with the network attack, and process additional network traffic corresponding to the DOS attack vector with the reconfigured first configurable hardware logic device; and responsive to determining the trigger condition is not associated with automatic reconfiguration:

output an indication related to the trigger condition.

10. The non-transitory computer readable medium of claim 9, wherein the executable code, when executed by the processors, further causes the one or more processors to reconfigure the one or more of the configurable hardware logic devices to disable hardware acceleration for at least one other feature in the set of features such that the other feature is subsequently provided by software, when the determination indicates the trigger condition is satisfied.

11. The non-transitory computer readable medium of claim 9, wherein the executable code, when executed by the processors, further causes the processors to configure the configurable hardware logic devices based on a received selection of one or more of the set of features or one or more personas comprising another one or more of the set of features.

12. The non-transitory computer readable medium of claim 9, wherein the executable code, when executed by the processors, further causes the processors to:

compare one or more characteristics of the monitored network traffic with a stored plurality of service signatures to identify one of the service signatures; and reconfigure the one or more of the configurable hardware logic devices based on the trigger condition to enable hardware acceleration for another feature not included in the set of features, wherein the another feature is correlated with the one of the service signatures.

13. A network traffic management system, comprising one or more network traffic management apparatuses, server devices, or client devices with memory comprising programmed instructions stored thereon and one or more processors configured to be capable of executing the stored programmed instructions to:

monitor network traffic exchanged with or between one or more clients or one or more servers using a first configurable hardware logic device configured to enable hardware acceleration for a first set of predetermined protection features comprising one or more features predicted to combat attacks above a set threshold;

determine, based on the monitored network traffic, that a trigger condition is satisfied when a network attack associated with a DOS attack vector is detected and when a predetermined protection scheme for defending against the detected network attack is absent from the first set of predetermined protection features;

responsive to determining the trigger condition is satisfied, route the network traffic to a second configurable hardware logic device configured to enable hardware acceleration for a second set of predetermined protection features comprising the predetermined protection scheme for defending against the detected network attack;

determine whether the trigger condition is associated with automatic reconfiguration;

responsive to determining that the trigger condition is associated with automatic reconfiguration:

reconfigure the first configurable hardware logic device to enable hardware acceleration for the predetermined protection scheme for defending against the detected network attack, when the determination indicates the trigger condition is satisfied, wherein the DOS attack vector comprises one or more attributes of one or more packets comprising at least a portion of the monitored network traffic associated with the network attack, and process additional network traffic corresponding to the detected network attack with the reconfigured first configurable hardware logic device; and responsive to determining the trigger condition is not associated with automatic reconfiguration:

output an indication related to the trigger condition.

14. The network traffic management system of claim 13, wherein the processors are further configured to be capable of executing the stored programmed instructions to reconfigure the one or more of the configurable hardware logic devices to disable hardware acceleration for at least one other feature in the set of features such that the other feature is subsequently provided by software, when the determination indicates the trigger condition is satisfied.

15. The network traffic management system of claim 13, wherein the processors are further configured to be capable of executing the stored programmed instructions to configure the configurable hardware logic devices based on a received selection of one or more of the set of features or one or more personas comprising another one or more of the set of features.

16. The network traffic management system of claim 13, wherein the processors are further configured to be capable of executing the stored programmed instructions to:

compare one or more characteristics of the monitored network traffic with a stored plurality of service signatures to identify one of the service signatures; and reconfigure the one or more of the configurable hardware logic devices based on the trigger condition to enable hardware acceleration for another feature not included in the set of features, wherein the another feature is correlated with the one of the service signatures.

17. The method of claim 1, further comprising:

statistically evaluating the exchanged network traffic; and responsive to determining that a first predetermined protection features of the first set of predetermined protection features is relevant to a percentage of the exchanged network traffic below a first threshold, replacing the first predetermined protection feature with a different protection feature.

18. The network traffic management apparatus of claim 5, wherein the processors are further configured to be capable of executing the stored programmed instructions to:

statistically evaluate the exchanged network traffic; and responsive to determining that a first predetermined protection features of the first set of predetermined protection features is relevant to a percentage of the exchanged network traffic below a first threshold, replace the first predetermined protection feature with a different protection feature.

19. The non-transitory computer readable medium of claim 9, wherein the executable code, when executed by the processors, further causes the processors to:

statistically evaluate the exchanged network traffic; and responsive to determining that a first predetermined protection features of the first set of predetermined protection features is relevant to a percentage of the exchanged network traffic below a first threshold, replace the first predetermined protection feature with a different protection feature.

20. The network traffic management system of claim 13, wherein the processors are further configured to be capable of executing the stored programmed instructions to:

statistically evaluate the exchanged network traffic; and responsive to determining that a first predetermined protection features of the first set of predetermined protection features is relevant to a percentage of the exchanged network traffic below a first threshold, replace the first predetermined protection feature with a different protection feature.

* * * * *